(12) United States Patent
Wang et al.

(10) Patent No.: US 6,985,442 B1
(45) Date of Patent: Jan. 10, 2006

(54) TECHNIQUE FOR BANDWIDTH SHARING IN INTERNET AND OTHER ROUTER NETWORKS WITHOUT PER FLOW STATE RECORD KEEPING

(75) Inventors: Zheng Wang, Holmdel, NJ (US); Zhiruo Cao, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 956 days.

(21) Appl. No.: 09/625,760

(22) Filed: Jul. 26, 2000

(51) Int. Cl.
*H04J 1/16* (2006.01)

(52) U.S. Cl. .................................................. 370/232

(58) Field of Classification Search ................ 370/230, 370/231, 232, 233, 234, 235, 236, 229
See application file for complete search history.

(56) References Cited

U.S. PATENT DOCUMENTS

| | | | | |
|---|---|---|---|---|
| 6,167,030 A | * | 12/2000 | Kilkki et al. ................ | 370/236 |
| 6,222,841 B1 | * | 4/2001 | Taniguchi .................... | 370/389 |
| 6,643,258 B1 | * | 11/2003 | Ise et al. ..................... | 370/230 |
| 6,646,988 B1 | * | 11/2003 | Nandy et al. ................ | 370/235 |

OTHER PUBLICATIONS

Demers, A. et al., "Analysis and Simulation of a Fair Queueing Algorithm", SIGCOMM Symposium on Communications Architectures and Protocols, Sep. 1989.
Shreedhar, M. et al., "Efficient Fair Queuing Using Deficit Round Robin", Proceedings of SIGCOMM'95, Sep. 1995.
Bennett, J. C. R. et al., "Hierarchical Packet Fair Queueing Algorithms", Proceedings of SIGCOMM'96, Aug. 1996.
S. Golestani, "A Self-clocked Fair Queueing Scheme for Broadband Applications", Proceedings of IEEE INFOCOM'94, Jun. 1994.
Floyd, S. et al., "Random Early Detection Gateways for Congestion Avoidance", IEEE/ACM Transactions on Networking, Aug. 1993.
Lin, D. et al, "Dynamics of Random Early Detection", Proceedings of SIGCOMM'97, Oct. 1997.
Stoica et al., "Core-Stateless Fair Queueing: Achieving Approximately Fair Bandwidth Allocations in High Speed Networks", Proceedings of SIGCOMM '98, Sep. 1998.
Wu, L. et al, "Thin Streams: An Architecture for Multicasting Layered Video", NOSSDAV'97, May 1997.

(Continued)

*Primary Examiner*—Huy D. Vu
*Assistant Examiner*—Daniel Ryman
(74) *Attorney, Agent, or Firm*—Barry H. Freedman; James Milton (57) ABSTRACT

In a network of interconnected edge and core routers, where packet data flows are received at edge routers and then transmitted toward intended destinations via a path through one or more core routers, fair bandwidth sharing is achieved without per-flow state monitoring in the interior routers. Each edge router is arranged to divide each input data flow into a set of layers each having an associated level, based on rate. The division process is done without reference to the content of the flow, and can use layers of equal or unequal size. The packets in a flow are marked at an edge router with their layer level, in a globally consistent manner. Each core router maintains a layer level threshold, based upon buffer management conditions, and drops layers whose level exceeds the threshold. During congestion, the level threshold is decreased; when congestion clears, the level threshold is increased.

17 Claims, 3 Drawing Sheets

OTHER PUBLICATIONS

Vicisano, L et al., "One to Many Reliable Bulk-Data Transfer in the Mbone", Proceedings of the Third International Workshop on High Performance Protocol Architectures HIPPARCH'97, Jun. 1997.

Donahoo, M. et al., "Multiple-Channel Multicast Scheduling for Scalable Bulk-Data Transport", Infocom'99, Mar. 1999.

Stoica, I., "NS-2 Simulation for CSFQ", http://www.cs.cmu.edu/~istoica/csfq 1998.

Blake, S. et al, "An Architecture for Differentiated Services", Internet Society Network Working Group Request For Comments #2475, Dec. 1998.

Jacobson, V., "Congestion Avoidance and Control", ACM SIGCOMM 88, 1988.

U.S. Appl. No. 10/136,840, filed Apr. 30, 2002, A. E. Eckberg.

* cited by examiner

On packet arrival:

```
    C_max = MAX(C_max, pkt_level);
if ((q_len > q_threshold) and
       (b_rcv ≥ q_maxsize/10) and
       (q_last < q_len) and (k > 0)) {
       /* Decrease the level threshold */
       C = C - 1;
       q_last = q_len;
       t_last = now;
       b_rcv = 0;
       k = k-1;
   }
   else if (now-t_last > update_int) {
      if (b_rcv < link_capacity * update_int) {
         /* Increase the level threshold */
         C = C + 1;
         C = MIN(C, C_max);
         q_last = q_len;
         t_last = now;
         b_rcv = 0;
         update (update_int);
      }
      k = C/4
   }
/*Count the traffic admitted by the level threshold C*/
if (C ≥ pkt_level) b_rcv = b_rcv + pkt_size;
/*Determine whether to admit the packet or not */
if ((q_len = q_maxsize) or C < pkt_level)) {
    drop packet;
}
  enqueue packet;
```

TECHNIQUE FOR BANDWIDTH SHARING IN INTERNET AND OTHER ROUTER NETWORKS WITHOUT PER FLOW STATE RECORD KEEPING

FIELD OF THE INVENTION

The present invention relates generally to techniques for transmitting data from multiple sources to multiple destinations via a network of interconnected nodes, in which the individual data packet flows are managed or controlled such that bandwidth through the network is allocated in a "fair" manner.

BACKGROUND OF THE INVENTION

Fair bandwidth sharing at routers has several advantages, including protection of well-behaved flows and possible simplification of end-to-end congestion control mechanisms. Traditional mechanisms to achieve fair sharing (e.g., Weighted Fair Queueing, Flow Random Early Discard) require per-flow state to determine which packets to drop under congestion, and therefore are complex to implement at the interior of a high-speed network.

Weighted Fair Queueing (WFQ) as a mechanism to achieve fair bandwidth sharing and delay bounds has been described by "Analysis and Simulation of a Fair Queueing Algorithm," by A. Demers et al., *SIGCOMM Symposium on Communications Architectures and Protocols*, September 1989, and *A Generalized Processor Sharing Approach to Flow Control In Integrated Services Networks*, Ph.D. thesis, Laboratory for Information and Decision Systems, Massachusetts Institute of Technology, February 1992. Strict WFQ is, however, generally considered too complex to implement in practice. Many variants of the WFQ algorithm have been proposed, with different tradeoffs between complexity and accuracy. See, for example, "Efficient Fair Queuing using Deficit Round Robin," by M. Shreedhar et al., in *Proceedings of SIGCOMM '95*, September 1995, "Hierarchical Packet Fair Queueing Algorithms," by Jon C. R. Bennett. et al., in *Proceedings of SIGCOMM '96*, August 1996 and "A Self-clocked Fair Queueing Scheme for Broadband Applications," by S. Golestani in *Proceedings of IEEE INFOCOM '94*, June 1994. Nevertheless, the WFQ computation is only part of the task; a per-flow queueing system also requires flow classification and per-flow state maintenance. Every incoming packet has to be classified to its corresponding queue. The per-flow reservation state has to be installed by a setup protocol such as RSVP and retrieved during packet forwarding for scheduling calculations. All of these are a considerable challenge when operating at high speeds with a large number of flows.

Random Early Detection (RED) has been proposed as a replacement to the simple tail drop. See "Random Early Detection Gateways for Congestion Avoidance,", by Sally Floyd et al., in *IEEE/ACM Transactions on Networking*, August 1993. RED monitors the average queue size and probabilistically drops packets when the queue exceeds certain thresholds. By dropping packets before the buffer is full, RED provides an early signal to the end systems to back off. However, RED cannot ensure fairness among competing flows. Flow Random Early Discard (FRED) improves the fairness of bandwidth allocation in RED by maintaining state for any backlogged flows. See "Dynamics of Random Early Detection," by Dong Lin et al in *Proceedings of SIGCOMM '97*, October 1997. FRED drops packets from flows that have had many packets dropped in the past or flows that have queues larger than the average queue length.

In recent work published by Stoica et al. in "Core-Stateless Fair Queueing: Achieving Approximately Fair Bandwidth Allocations in High Speed Networks", Proceedings of SIGCOMM '98, September, 1998, a Core-Stateless Fair Queueing (CSFQ) scheme was proposed to approximate fair bandwidth sharing without per-flow state in the interior routers. The main idea behind the CSFQ architecture is to keep per-flow state at slower edge routers and carry that information in packets to the core. Specifically, packets are labeled with flow arrival rate; core routers estimate the fair share and probabilistically drop packets whose arrival rate (as marked) exceeds the fair share. Through simulations, CSFQ was shown to achieve a reasonable degree of fairness: CSFQ tends to approach the fairness of Deficit Round Robin (DRR) (see "Efficient Fair Queuing using Deficit Round Robin," by M. Shreedhar et al., in *Proceedings of SIGCOMM '95*, September 1995, and to offer considerable improvement over FIFO or Random Early Detection (RED) (see "Random Early Detection Gateways for Congestion Avoidance," by Sally Floyd et al., in *IEEE/ACM Transactions on Networking*, August 1993. While CSFQ may offer great promise for making fair bandwidth sharing feasible in high-speed networks, it has disadvantages, because it requires estimation of fair share, and such estimation is very complex and difficult.

Another technique which has been suggested in the context of congestion control of multicast video and audio streams, relates to layering. In these layering schemes, video or audio traffic is usually divided into a small number of layers, typically through sub-band encoding. Receivers can choose the number of layers of traffic to receive based on the bandwidth available to them. Such an approach has been considered for video in "Thin Streams: An Architecture for Multicasting Layered Video," by L. Wu et al., in *NOSSDAV '97*, May 1997, and for bulk-data transfer in "One to Many Reliable Bulk-Data Transfer in the Mbone," by Lorenzo Vicisano et al., in *Proceedings of the Third International Workshop on High Performance Protocol Architectures HIPPARCH '97*, June 1997 and "Multiple-Channel Multicast Scheduling for Scalable Bulk-Data Transport," by Michael Donahoo et al., in *Infocom '99*, March 1999. These approaches require that the content of the multicast video and audio streams be examined, and then processed or sliced such that more important information (such as reference or base level information) is differentiated from less important information (such as differential information representing only changes or differences between the current value and the reference or base level information). This is done so that the layers containing the less important information can be discarded first, in the event of congestion.

SUMMARY OF THE INVENTION

In order to achieve fair bandwidth sharing without per-flow state in the interior routers, each edge router is arranged to divide each input data flow into a set of layers each having an associated level, based on rate. The division process, which is done without reference to the content of the flow (as is necessary in the case of multicast video and audio streams as described above) can use layers of equal size, but advantageously, the organization of the layers is non-linear. The packets in a flow are marked at an edge router with their layer level, in a globally consistent manner.

Each core router maintains a layer level threshold, based upon buffer management conditions, and drops layers whose level exceeds the threshold. Specifically, during congestion, the level threshold is decreased; when congestion clears, the level threshold is increased. Because the level assignments are based on rate, the discarding of packets is approximately fair.

In accordance with an aspect of our invention, when different flows are accorded different committed service levels, layering is done in such a way that each assigned level is given a weight that corresponds to the committed service level of the respective flow. Through interaction with the buffer management algorithms, the discarding of packets during congestion can advantageously be made proportional to the weights of the flows.

The present invention advantageously moves complexity away from the core towards the edges of the network. The core routers operate using simple FIFO scheduling, with a threshold-based packet discarding mechanism. The core routers use simple primitive operations, which makes the present invention amenable to relatively easy hardware implementation.

The present invention differs from CSFQ in several important respects: First, state information carried by the packets are the layers they belong to, rather than the explicit rate of their flows. Second, core routers operate in a simplified manner, because the core routers only need to perform threshold-based dropping rather than the exponential averaging used in CSFQ. This results in an arrangement that is simple and amenable to hardware implementation. In terms of complexity at edge and core routers, the present invention is roughly comparable to CSFQ. The present invention must do some additional processing in the edge routers to assign different layers to packet flows without exceeding the rate for each layer, the processing in the core routers is a bit simpler, since packets are dropped based on a comparison to the level threshold rather than requiring a computation of fair share. Note that, if desired, the present invention can be modified so that it ALSO uses an explicit fair share computation (as in CSFQ), essentially producing a hybrid of the two schemes. Also note that the present invention permits an application to express a preference for certain packets to be preserved under congestion by marking them with a lower level value, subject to constraints on the rate for each layer.

BRIEF DESCRIPTION OF THE DRAWING

The present invention will be more fully appreciated from a consideration of the following Detailed Description, which should be read in light of the accompanying drawing in which.

DETAILED DESCRIPTION

In accordance with the present invention, a packet layering and buffer management scheme emulates the fair sharing of WFQ, but avoids packet classification and per-flow state operations in the core switches or routers. With the present invention, core switches or routers still perform FIFO scheduling, but with more sophisticated buffer management. Implementation complexity is much lower compared with a per-flow queueing system.

Figure 1:
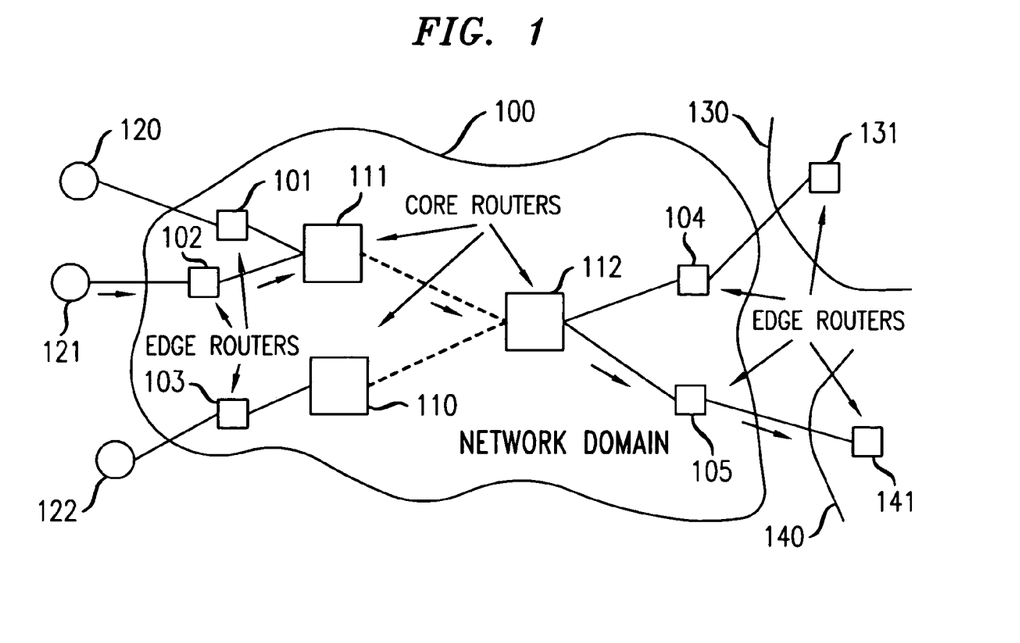
FIG. 1 is a diagram illustrating a network comprised of edge routers and core routers in which the present invention is used.

The network model or topology used with the present invention is the same as that used in CSFQ and in Differentiated Services: namely, a network 100 comprised of edge routers 101–105 and core routers 110–112. Some edge routers, such as edge routers 101–103, connect network 100 to user locations 120–122. Other edge routers, such as edge routers 104 and 105, connect network 100 to edge routers 131 and 141 in other networks 130 and 140, respectively. Core routers 110–112 interconnect the edge routers within network 100, but have no direct connections to elements in other networks or to user locations. While we refer to routers 110–112 as core routers, they are also sometimes called core switches. Likewise, while we refer to routers 101–105 as edge routers, they are also sometimes called edge switches. See "NS-2 Simulation for CSFQ," by Ion Stoica, http://www.cs.cmu.edu/~istoica/csfg, 1998. The edge routers 101–105 perform packet classification and encode only certain level information in packet headers. Then, the core routers 110–112 use the level information for packet discarding. In this model, a flow is defined as a stream of packets which traverse the same path in a network domain and require the same grade of service at each switch or router in the path.

It is to be noted that two aspects of the present invention are similar to the arrangement used in Differentiated Services, namely, (1) moving processing complexity to the edge switches or routers, and (2) emphasizing an agreement with respect to level of service for the traffic flow.

The migration of complexity away from network core devices is important, since, as the Internet expands, the backbone trunk capacity continues to grow at a rapid speed. This means that the amount of time that is available for processing a single packet becomes very small. For example, at the OC12 speed (622 mbps), the per-packet processing time is less than 1 microseconds to process for 64 bytes packets. The number of flows in the core switches or routers inside the network can potentially be very large. It is therefore advantageous to move the computationally intensive per-flow processing such as classification and policing to the edge of the network, where the traffic rates are lower and flows from different sources are usually not mixed.

In the present invention, edge routers carry out all per-flow state operations, including maintaining per-flow state, monitoring the average transmission rate of flows and slicing traffic into various layers. The functions that core routers need to perform are kept to minimum and can be implemented as part of the buffer management process: monitoring buffer occupancy and discarding certain layers when backlogged packets exceed buffer thresholds.

With respect to the situation in which there is a service level agreement (SLA), such that a given amount of capacity is "committed" to a given flow, the present invention assumes that the committed information rate (CIR)—the amount of traffic that a customer is allowed to inject into the network—is controlled. The actual amount of bandwidth that any particular data flow may receive in the event that the competing flows encounter a bottleneck depends upon weights assigned to the individual flows. However, the bandwidth resource is always allocated such that all backlogged flows receive bandwidth in proportional to their CIRs.

Thus, in one embodiment of the present invention, it is assumed that all flows have the same weight. In an alternative embodiment that accounts for an SLA, a version of the present invention, described below, is used such that different weights are assigned to different flows. In both embodiments, as indicated previously, there are two main components in the present invention: (1) flow evaluation, layering and packet level assigning, performed in the edge routers and (2) buffer management and packet discarding (if necessary) performed in the core switches or routers, based only upon the level associated with the packets as compared to the then present threshold.

When a flow arrives at the edge of the network, its rate is estimated by an exponential average based on the packet inter-arrival time. The edge router then divides the flow into many "thin" layers. Each layer is assigned a number, which we call a "level". The layers (and their associated levels) have two purposes. First, they reflect the rate of the flow: the larger the number of layers is, the higher the rate of the flow is; flows with the same rate have the same number of layers. Second, the layers provide a structure for controlled discarding in the network when congestion occurs.

Inside the network, different flows are, of course, interleaved. Since the core routers do not perform per-flow operations, they cannot distinguish packets on a per-flow basis. Instead, they operate on a single packet stream with many different levels associated with the different layers. The core routers still operate in simple FIFO fashion. When the backlogged packets exceed some threshold, the core routers discard packets to reduce the traffic load. The discarding starts with the packets with the highest level. That is, the routers "cut" layers from the top level down to the bottom or lowest level. Because the level assignments are done proportionally to the rate, the packet discarding approximates that of a WFQ system.

Figure 2:
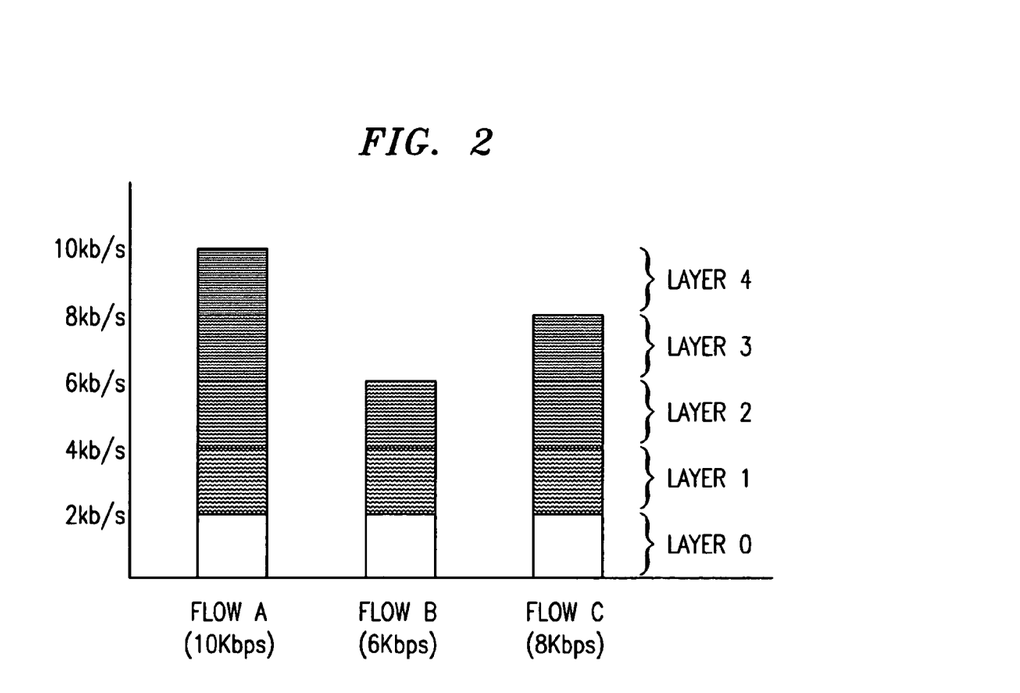
FIG. 2 is a diagram showing three flows packet flows, A, B and C with rates of 10 Kbps, 6 Kbps and 8 Kbps, that may be processed in accordance with the present invention.

The operation of the present invention is illustrated with an example in FIG. 2, which shows three flows A, B and C with rates of 10 Kbps, 6 Kbps and 8 Kbps, respectively. In this example, assume that each of five different layers (shown as layers 0 through 4 in FIG. 2), corresponds to a rate of 2 Kbps. (We later discuss the issue of a "good" selection of rates for the layers.) When the three flows arrive at the edge of the network, they are divided into layers based on their rates. Thus, flows A, B and C are divided into five, three and four layers respectively. Specifically, the packets making up flow A are divided among five layers, with one fifth of the packets being assigned to each of the layers 0 through 4. These packets are said to have levels 0 (lowest) to 4 (highest). The packets making up flow B are divided among three layers, namely layers 0 through 2, with one third of the packets being designated as having each of levels 0 (lowest) to 2 (highest). Finally, packets making up flow C are divided among four layers, namely layers 0 through 3, with one fourth of the packets being designated as having each of levels 0 (lowest) to 3 (highest).

Suppose that the three flows converge at a core router. Then we have a packet stream with five possible levels (0 through 4) and the composition is given in the following Table:

| Level of layer | Rate (kbps) | Contribution |
| --- | --- | --- |
| Layer 4 | 2 | flow A |
| Layer 3 | 4 | flow A, C |
| Layer 2 | 6 | flow A, B and C |
| Layer 1 | 6 | flow A, B and C |
| Layer 0 | 6 | flow A, B and C |

When congestion is detected, the core routers are arranged to discard packets designated as level 4 (four) first, then level 3, then level 2, and so on, with the highest level being discarded first. In the example above, all packets having level 4 come from flow A. Thus, if congestion is such that only level 4 packets are discarded, then the rate of flow A is reduced to 8 Kbps, and flows B and C are not affected at all.

If, in the same example, the bottleneck only has a capacity of 18 Kbps, both levels four and three will then be discarded, and all three flows will receive the same amount of bandwidth (6 Kbps). As we can see from this example, the structure provided by the multiple layers allows the packet discarding to be done in a way similar to that of WFQ.

The present invention has four important details: (1) the estimation of the flow arrival rate at the edge routers, (2) the selection of the rates for each layer, (3) the assignment of layers to packets, and (4) the core router algorithm. We consider each of these details in turn.

Flow Arrival Rate Estimation

At the edge routers, the flow arrival rate must be estimated, in order to assign a layer. To estimate the flow arrival rate, we can use an exponential averaging formula similar to that used in CSFQ. See "NS-2 Simulation for CSFQ," by Ion Stoica, http://www.cs.cmu.edu/~istoica/csfq, 1998. This arrangement requires each edge router to maintain state information for each active flow. Specifically, let $t_i^k$ and $l_i^k$ be the arrival time and length of the kth packet of flow i. The estimated rate of flow i, is calculated as:

$$r_i^{new} = (1 - e^{-T_i^k/K}) l_i^k / T_i^k + e^{-(T_i^k/K)} r_i^{old}$$

where $T_i^k = t_i^k - t_i^{k-1}$ and K is a constant.

Using an exponential weight $e^{-(T_i^k/K)}$ gives more reliable estimation for bursty traffic, even when the packet inter-arrival time has significant variance.

Selection of Layer Rates

After estimating the flow arrival rate, each packet is assigned to a layer, with the constraint that the average rate of packets with level l is at most $c_l$. We discuss the issue of assigning layers to packets below; we are concerned here with the choice of the rates $c_l$. One important fact is that layers are assigned from bottom up, with smaller level values assigned before the layers with large values. That is, a flow with arrival rate r will be assigned layers with levels 0 . . . j, where j is the smallest value satisfying $$\sum_{i=0}^{j} c_i \geq r.$$

Note that the layer level information is carried in the packet header, thus the number of different levels that can be used is limited. For packet flows using the IPv4 format, for example, the layer level can be put in the Type of Service field of the IP header, as it is used in Differentiated Services. See S. Blake, et al, "An Architecture for Differentiated Services", Internet Society Network Working Group Request For Comments #2475, December 1998. If the label is 8-bits long, 256 level values can be accommodated.

In accordance with the present invention, the flow is then partitioned into layers according to the flow's rate and each layer is assigned a level. Specifically, layers are partitioned (1) incrementally, meaning that a layer of level l is assigned only when the lower l−1 levels have previously been assigned, and (2) each layer carries a specific portion or fraction of the data with respect to its PIR, but the overall data flow is not otherwise partitioned based upon content, as would be the case in the prior art multimedia layering approaches described above.

Assuming $r_l$ is the rate of sub-layer l, a flow of rate r is therefore partitioned into layers of level 0 . . . n−1 and $$\sum_{l=0}^{n-1} r_l = r.$$

The higher a flow's rate is, the more layers the flow is partitioned and more levels are assigned. If a flow is transmitting at its peak rate PIR, then it is divided into the maximum N+1 layers and each layer is assigned a level from 0 to the maximum level value N. Packets belong to the same sub-layer are all assigned the same level.

There are clearly many options for selecting the rates $c_l$ for the different layers. The simplest approach is to make all layers have equal rate. However, for low rates, the granularity can be very coarse. For example, assume the rate of a flow's top layer is ck. When congestion occurs, cutting one layer will reduce the total throughput by ck/r. When r is small, the layer cut will severely reduce the total throughput of the flow. If there are many such low rate flows sharing the link, a layer cut will cause the link to become severely under-utilized. Therefore, one of the objectives in layer rate selection is to minimize the affect to a flow and link utilization when a layer cut takes place.

Figure 3:
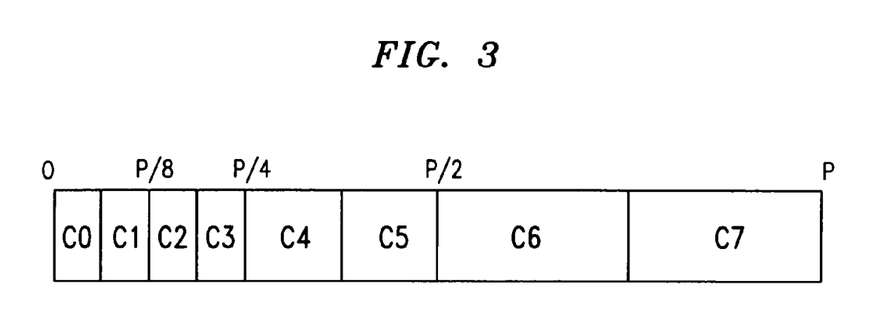
FIG. 3 is a diagram showing an example of eight layers C0 to C7 into which the packet flows of FIG. 2 can be divided.

Based on simulations and analysis, it is preferable to use a non-linear arrangement of assigning layers, in which layers with lower levels are given smaller rates (and thus finer granularity), while layers with higher levels are given larger rates. We divide the rate spectrum into "blocks" and use a combination of equal rates (within a block) and exponentially increasing rates (from one block to the next). This particular partition method is advantageous because it requires very simple computation to determine which layer a packet should belong to. Specifically, layer i has rate $c_i$:

$$c_i = \begin{cases} \dfrac{(1-a^{-1})^{N/b-INT(i/b)-1}}{ab} P & b \leq i \leq N \\ \dfrac{(1-a^{-1})^{N/b-1}}{b} P & 0 \leq i < b \end{cases}$$

where N is the total number of layers. Parameters a and b determine the block structure, and N must be a multiple of b. P is the maximum flow rate in the network. For example, when N=8 and a=b=2, the layer rates are illustrated in FIG. 3. In that figure, eight layers C0 to C7 are shown. The lowest layers C0 through C3 are equal to each other, and each represent ¹⁄₁₆ of the flow. The next layers C4 and C5 each represent ⅛ of the flow, while the remaining layers C6 and C7 each represent ¼ of the flow. The rate of the layer is depicted in FIG. 3 by the width of its rectangle. Advantageously, by using this approach to partitioning, the layer calculation only requires simple operations.

Level Assignment

We now turn to the issue of assigning levels to the packets. Recall that the constraint is that the average rate of packets with level l is at most $c_l$. However, if the time scale over which the average is taken is too long, significant unfairness and performance degradation can result. One of the simplest ways to assign levels to packets may be to keep a level counter for each flow with which to mark packets, and increase the level counter when enough packets have been marked by that level. However, assigning the same or adjacent levels to subsequent packets in a flow may cause significant unfairness when congestion occurs. As we will discuss below, the core routers discard packets using a level threshold. Therefore, the burst created by the packets with the same or adjacent levels is not preferable for fairness control, because a burst of packets with the same level may cause temporary buffer overflow which can be avoided if the traffic within a level is smoothed. Furthermore, dropping of consecutive packets from a TCP connection will significantly affect the throughput of a TCP flow. See "Congestion Avoidance and Control," by Van Jacobson, in *ACM SIGCOMM* 88, 1988 and "Random Early Detection Gateways for Congestion Avoidance," by Sally Floyd et al., *IEEE/ACM Transactions on Networking*, August 1993.

There are a number of ways in which levels can be assigned. The simplest is a probabilistic level assignment scheme, in which each packet is randomly assigned a level with a probability determined by the layer's rate. Specifically, suppose the current estimate of the flow arrival rate is r, and j is the smallest value satisfying $$\sum_{i=0}^{j} c_i \geq r.$$

Then the current packet is assigned level $0 \leq l \leq j$ with probability $$c_l / \sum_{i=0}^{j} c_i.$$

When all packets have fixed size, it is easy to see that the probabilistic level assignment will cause the rates for each layer to approach the required rates $c_l$. When the packet sizes are variable, it can also be shown that the random assignment will result in average rates for different layers that approximate the designated distribution.

Figure 4:
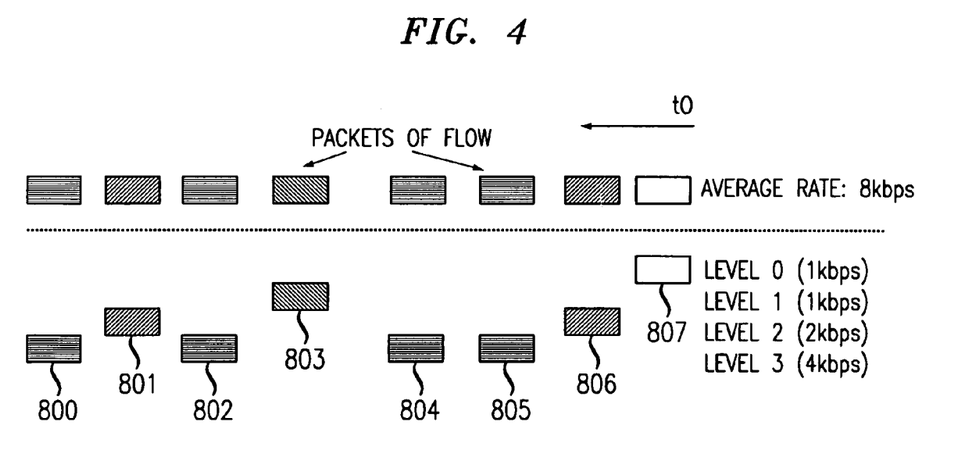
FIG. 4 is is a diagram showing an example of layer assignment for eight packets 800–807 that are part of a flow at rate 8 Kbps.

An example of layer assignment is shown in FIG. 4. Eight packets 800–807 shown in the bottom portion of the figure form a flow at rate 8 Kbps. By using a random assignment, four packets 800, 802, 804 and 805 are assigned to level 3, two packets 801 and 806 are assigned to level 2, and one each (packets 803 and 807) are assigned to levels 1 and 0, respectively. This arrangement is desirable, so that packets in the same or adjacent layers are spread out evenly. This is shown in the top portion of FIG. 4, in which the same packets are shown in a sequence, ready to be interleaved with packets from other flows. Therefore, the sub-layer admitted to the router will not present large burst which may cause severe unfairness.

Core Router Process

In accordance with the present invention, core routers are arranged to monitor buffer occupancy and discard selected layers when backlogged packets exceed certain thresholds. The objective is to achieve approximate fair queueing while maintaining high utilization.

Figure 5:
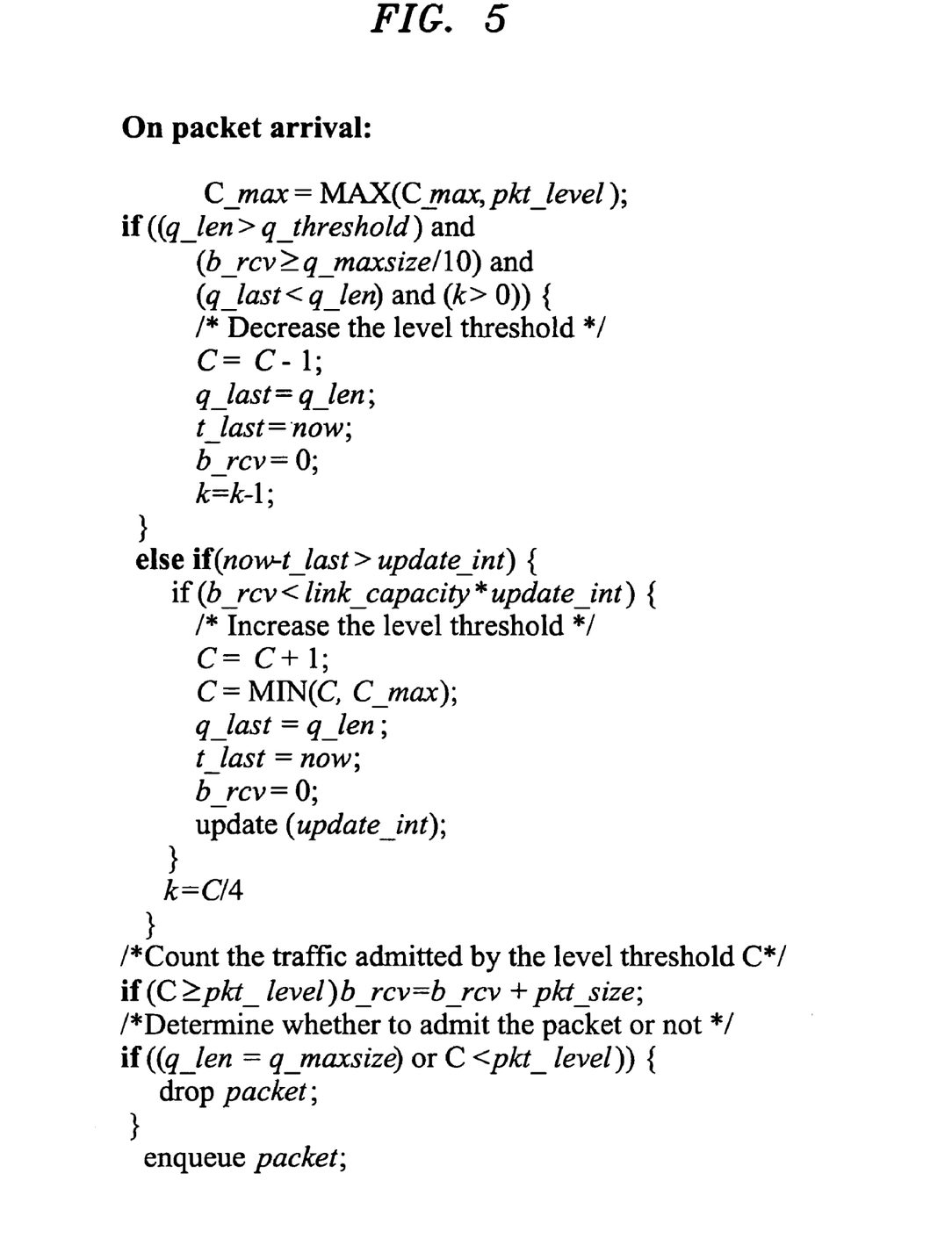
FIG. 5 illustrates the pseudo-code for the core router process in accordance with the present invention.

The pseudo-code for the core router process in accordance with the present invention is shown in FIG. 5. The main task is to update the layer threshold C according to the current congestion status. Initially, C is set to the maximum layer value. Upon each packet arrival, $C_{max}$ is updated to record the largest layer level having been seen. When the current queue length $q_{len}$ reaches a threshold q_threshold, it is likely that the link is congested and C should be decreased. However, over-reacting may compromise the performance. Our invention decreases C when the following three conditions are all met: (1) since the last C update, 0.1. q_maxsize bytes have been accepted into the buffer; (2) the queue length has increased since the last C update; (3) only k consecutive C decreases are allowed, where k is set to be 0.25 C every time interval $update_{int}$. Condition 1 prevents very frequent changes to help ensure stability. Condition 2 ensures that the input traffic does exceed the output capacity so that a layer cut is necessary. Condition 3 prevents the system from over reacting on detected congestion. Note that the C decrease frequency is also self-clocked in that when C is set too high, the packet acceptance rate is high, condition 1 is met more quickly, and C is decreased faster.

After every time interval $update_{int}$, if the average input rate $b_{rev}/update_{int}$ is less than the link capacity $link_{capacity}$, the level threshold C is increased. $b_{rev}$ is the traffic (in bytes) that is allowed into the buffer by the level threshold C. The threshold update interval $update_{int}$ is adjusted every time C is increased so that the closer the service rate is to the link capacity, the longer the $update_{int}$ is and less frequently the level threshold is updated.

As indicated earlier, the present invention can be arranged such that different weights can be assigned to individual packet flows. This is especially useful when it is desired to accommodate a service level agreement (SLA), such that a given amount of capacity is "committed" to a given flow, as discussed above. Specifically, let wi denote the weight for flow i. Then the packets in this flow are marked such that the average rate for packets labeled with level j is wi*cj. That is, a larger weight allows more packets to be marked with lower level values than a smaller weight. The remainder of the technique is essentially the same as the unweighted case described above.

While the foregoing discussion pointed out the differences between the present invention and the layering applications used in connection with certain prior art multimedia applications, it is to be noted here that the present invention can be used in conjunction with that approach. Thus, while there are significant differences between the arrangements, they are not inconsistent or incompatible, and, in fact, benefits can be derived by using both approaches together. The key, of course, is that the restrictions applicable to the layering approach, namely the requirement of identifying, in advance, layers or levels of the input packet stream that are the most significant, in terms of information content, are not imposed on the present invention.

Layered multi-media applications offer great flexibility in delivering media to end users with performance best suited to individual characteristics. For example, in layered video delivery, the video stream is partitioned into a number of layers. The base layer can be played back with minimum quality, and each additional layer adds quality to the video. In most encoding schemes, the decoding of additional layers depends on the lower layers. Thus, the lower layer data are more important than higher layer data. This layered adaptation model works well in a heterogeneous Internet: a customer with constrained bandwidth can subscribe to a limited number of layers and achieve acceptable quality. If customers have enough bandwidth, they can subscribe to all layers to achieve the maximum quality. Hence, the quality received by end users is optimized without explicit adaptation by senders, through dropping or adding layers by receivers or gateways. The quality adaptation avoids the many round trip delays usually required by closed-loop adaptation mechanisms, and it is well suited for real-time multimedia delivery and multicast applications.

Because the present invention can be thought of as having a prioritized layering approach, the layered encoding in multimedia applications fits naturally within the present invention. Specifically, layers in multimedia flows can be mapped directly to the layers formed by edge routers operating in accordance with our invention. The more important data layers can be assigned lower level values, while other data layers are assigned higher level values. When congestion occurs inside the network, less important data packets are dropped first. There are at least two ways to implement the mapping at edge routers. Current Internet routers can already "look" into packets to determine the type of packets, and then they can assign level values based on the packet type. Another approach is that the application at the end station may label its packets with level or layer information in packet headers, and the edge routers can then retrieve this information to assign layers/levels.

We have evaluated the present invention as compared to CSFQ, DRR and RED with several different configurations and traffic sources. The simulation results show that the present invention is able to achieve approximately fair bandwidth sharing in all of these scenarios. The performance of the present invention is comparable to that of CSFQ, and it performs much better than RED. The simulations also show that the present invention outperforms CSFQ and DRR with respect to "goodput", i.e., the effective throughput, as determined by the data successfully received and decoded at the receiver, when applications take advantage of using different layers to encode preferences.

Various modifications and adapations of the present invention will be apparent to those skilled in the art, and the invention is therefore to be limited only by the appended claims. For example, although the previous description addressed layering to achieve fair bandwidth sharing in the context of individual packet flows, it is possible to extend the invention to aggregated flows that comprise many individual flows. To accomplish aggregation, changes would only be needed at the edges of the network; the core router processes can remain the same. With aggregation, instead of assigning layers to an individual flow, the edge routers simply bundle or classify packets into an aggregate flow (e.g., all packets from a particular source network to a web server), and layer the aggregate flow the same way. One issue is that an aggregate flow may take multiple paths. For example, a source network may connect to two different ISPs and load balance between them. Thus, packets from the same source network to the same destination may follow two different paths. This will affect the structure of the layers of the packets in both paths. However, this may be overcome with a random layer assignment.

What is claimed is:

1. In a network of interconnected edge routers and core routers, a method of processing packets in a plurality of packet data flows received at said edge routers for transmission toward intended destinations via a path through one or more of said core routers, said method comprising the steps of assigning a level indicator to packets in each of said packet data flows, each said level indicator representing one of a plurality of layers that cumulatively represent a rate of said packet data flow of which said packets are a part, said packets being randomly assigned said level indicator with a probability determined by said rate of said layers;

establishing a threshold level in each of said core routers, based upon network congestion conditions, and dropping in said core routers, packets whose level indicator exceeds said threshold level.

2. The method of claim 1, wherein said threshold level is decreased when network congestion occurs and increased when network congestion clears.

3. The method of claim 1, wherein said layers are unequal in size.

4. The method of claim 3, wherein said layers have sizes arranged in an exponential order.

5. The method of claim 1, wherein said assigning step includes distributing packets that are a part of a particular packet data flow among the layers that cumulatively represent the rate of said packet data flow, such that the number of packets assigned to a given layer is proportional to the size of that layer.

6. The method of claim 1, said layers being assigned from bottom up with smaller level indicators assigned before said layers with large values.

7. The method of claim 1, wherein each of said packet data flows requires the same grade of service at each router in said path.

8. The method of claim 1, wherein said threshold is initially set to a maximum value of said layers.

9. In a network of interconnected edge routers and core routers, a method of processing packets in a plurality of packet data flows received at said edge routers for transmission toward intended destinations via a path through one or more of said core routers, said method comprising the steps of determining a rate at which each of said packet data flows are received at said edge routers;

responsive to said determining step, establishing a plurality of layers, such that (a) the size of each layer corresponds to a portion of a maximum rate at which said each packet data flow is received at said edge routers, and (b) the total size of said layers cumulatively represents said maximum rate of said each packet data flow, assigning packets in said each packet data flow to one of said layers such that an average number of packets assigned to each layer is proportional to the relative size of that layer as compared to the cumulative size of all of said layers;

associating a level indicator with each of said layers, said packets being randomly assigned said level indicator based on a probabilistic level assignment scheme;

establishing a threshold level in each of said core routers, based upon network congestion conditions, and dropping in said core routers, packets whose level indicator exceeds said threshold level.

10. The method of claim 9, wherein said threshold is initially set to a maximum value of said layers.

11. The method of claim 9, wherein said rate at which each of said packet data flows are received at said edge routers is calculated as $$r_i^{new} = (1 - e^{-T_i^k/K}) l_i^k / T_i^k + e^{-(T_i^k/K)} r_i^{old}$$

where $T_i^k = T_i^k - T_i^{k-1}$ and K is a constant.

12. The method of claim 9, wherein said establishing said plurality of layers is done without reference to the content of said packet data flows.

13. In a network of interconnected edge routers and core routers, a method of processing packets in a plurality of packet data flows received at said edge routers for transmission toward intended destinations via a path through one or more of said core routers, said method comprising the steps of determining a rate at which each of said packet data flows are received at said edge routers;

responsive to said determining step, establishing a plurality of layers each having an associated level value, such that (a) the size of each layer corresponds to a portion of a maximum rate at which said each packet data flow is received at said edge routers, and (b) the total size of said layers cumulatively represents said maximum rate of said each packet data flow, assigning packets in said each packet data flow to one of said layers such that an average number of packets assigned to each layer is proportional to a relative size of that layer as compared to a cumulative size of all of said layers; and transmitting each packet toward its destination together with information representing the level value associated with the layer to which said each packet is assigned.

14. The method of claim 13, wherein said rate at which each of said packet data flows are received at said edge routers is calculated as $$r_i^{new} = (1 - e^{-T_i^k/K}) l_i^k / T_i^k + e^{-(T_i^k/K)} r_i^{old}$$

where $T_i^k = T_i^k - T_i^{k-1}$ and K is a constant.

15. In a network of interconnected edge routers and core routers, a method of processing packets in a plurality of packet data flows received at said core routers from one of said edge routers, establishing a threshold level in each of said core routers, based upon network congestion conditions, examining a threshold value associated with each packet received in said core router, and dropping in said core routers, packets whose level indicator exceeds said threshold level, wherein said threshold value is determined in said edge router by determining a rate at which each of said packet data flows are received at said edge routers;

responsive to said determining step, establishing a plurality of layers, such that (a) the size of each layer corresponds to a portion of a maximum rate at which said each packet data flow is received at said edge routers, and (b) the total size of said layers cumulatively represents said maximum rate of said each packet data flow, and assigning packets in said each packet data flow to one of said layers such that an average number of packets assigned to each layer is proportional to the relative size of that layer as compared to a cumulative size of all of said layers.

16. The method of claim 15, wherein said threshold is initially set to a maximum value of said layers.

17. The method of claim 15, wherein said rate at which each of said packet data flows are received at said edge routers is calculated as $$r_i^{new} = (1 - e - T_i^k/K) l_i^k / T_i^k + e - (T_i^k/K) r_i^{old}$$

where $T_i^k = T_i^k - T_i^{k-1}$ and K is a constant.

* * * * *